Figure 1:
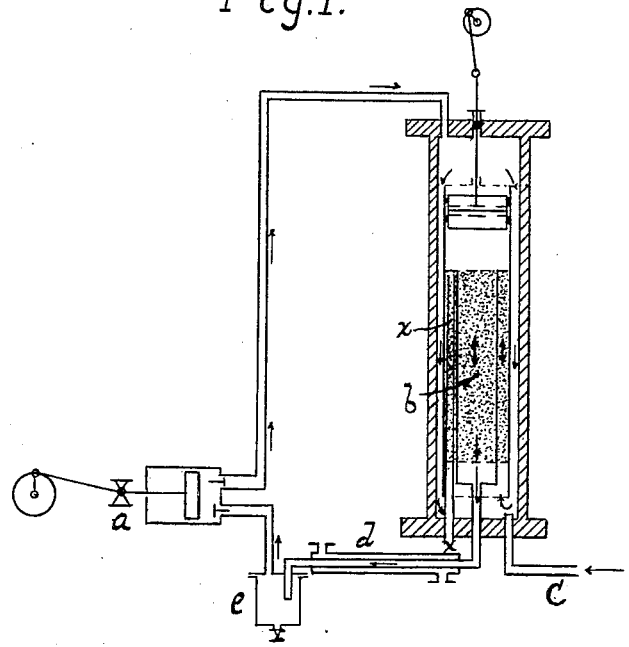

Jan. 10, 1933.   M. PIER ET AL   1,894,257
PRODUCTION OF LIQUID HYDROCARBONS
Filed May 23, 1928

Mathias Pier
Eugen Anthes
INVENTORS

BY
Hauff & Barland
ATTORNEYS

Patented Jan. 10, 1933

1,894,257

UNITED STATES PATENT OFFICE

MATHIAS PIER, OF HEIDELBERG, AND EUGEN ANTHES, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF LIQUID HYDROCARBONS

Application filed May 23, 1928, Serial No. 280,067, and in Germany May 28, 1927.

This invention relates to improvements in the production of liquid hydrocarbons or their derivatives by heat treatment of substances of the nature of coal, tars, mineral oils and the like, these substances being hereinafter referred to for the sake of brevity as carbonaceous materials, in the presence of or with an addition of gases or vapors and with or without the application of pressure.

We have found that such processes in which hydrocarbons or their derivatives are produced by heat treatment of carbonaceous materials and in which gases or vapors or both are passed through the material under treatment or over catalysts, especially the destructive hydrogenation of substances of the nature of coal, tars, mineral oils, and the like, or the low temperature carbonization of solid bituminous substances with the aid of scavenging gases, may be carried out in a particularly advantageous manner, if the gases or vapors used be kept in a state of highly active movement in the reaction space, that is to say at a higher rate of flow of the said gases or vapors, than at which they enter and leave the reaction chamber, so that a far more extensive intimate contacting of the said gases and vapors is attained than was hitherto possible. This may be effected in the reaction space itself, for example by setting the said gases or vapors into a pulsating or oscillating state of motion, or by repeatedly passing the gases or vapors between the place of introduction of fresh gas and withdrawal of reaction gases through the reaction space, that is, circulating them in the same direction in which they pass through the reaction vessel an elevated temperature being preferably maintained and cooling being avoided in all parts of the circular path taken by the gases. The essence of these methods of operation is that a higher rate of flow is impressed on the gases or vapors in the reaction space, than they have for example when entering the reaction chamber for the first time. By the expressions "rate of flow" and "speed" is meant the amount of gas moved in the unit of time through a given cross-sectional area, it being understood that the whole of the gas is passed through the said area. The direction of movement is always reckoned positive in the present case, whatever the direction may be. The pulsating state of motion of the gases in the reaction chamber may be set up, for example by means of a piston moving to and fro, and in the case of reactions carried out under pressure, the said piston should preferably have a higher pumping effect, that is to say if, for example, the pistons of the compressor and of the reaction vessel have the same cross-sectional area, the latter should make a considerably larger number of strokes in the unit of time than the piston of the compressor. In this way it is brought about that a greater amount of gas is moved in the reaction vessel in the volume of time than in the other parts of the apparatus.

The treatment when carried out in this manner proceeds at a far more rapid rate, and even large quantities of gas can be utilized in a most economical manner; at the same time an extensive scavenging of the catalysts and the substances to be treated, and intimate contact and intermixture of the catalyst and the reaction gases is effected. A good distribution of heat is also effected by the large quantities of the moved gases and vapors.

The partial pressure of the substances under treatment, if such be vaporizable, is preferably kept as low as possible whereby, for example in the destructive hydrogenation of substances of the nature of coal and the like, products substantially of low boiling point are obtained.

The reaction products may be separated from the gases either periodically, i. e., when the concentration of the products to be recovered has attained a certain degree in th hot moving gases, for the purpose of recovering the reaction products, either the whole of the gases and vapors in motion may be led away, and the reaction products recovered therefrom or, preferably, a portion of the gases with the vapors of the products contained therein, may be withdrawn from the reaction vessel for recovering the products, for example, by condensation, and either replaced by fresh gases, or the residual gases may be returned into the vessel in a circulatory system after being reheated or the said separation may be effected continuously, for example, when circulating the gases within the reaction vessel, by branching off a portion of said gases and treating said portion for the removal of the reaction products. In this latter case the separation may be effected by cooling the branched off portion, and if desired, then returning it into the cycle after heating it up again. If solid substances are treated, for example in the low-temperature carbonization of coals, these may, if desired, be progressively moved through the reaction chamber, in contact with the moving gases, either in the same direction or in counterflow.

The hot moving gases may also be passed through one or more further reaction chambers, for example through a second reaction chamber, charged with a suitable catalyst in which the products formed in the first reaction chamber, such for example as products of higher boiling point, are further treated, for example for the production of benzines. Again by employing several reaction chambers arranged one behind the other at different temperatures and preferably operating in each of the said chambers with the aid of catalysts, a further conversion, by stages when necessary, of the primary products may be effected, so that the partial pressure of the primary products is kept low and the preliminary conditions for the continued formation of primary conversion products are established, whilst the converted formed products are partly retained in the moving gases. The process is particularly suitable for the conversion of hydrocarbons of high boiling point into others of low boiling point, in operations performed in the liquid phase. In such cases it may be advisable to use the catalysts or contact masses, not in the reaction chamber itself, but at any convenient or suitable stage in the course of the hot moving gas since otherwise the impurities of the hydrocarbons to be converted in the reaction chamber might, in certain circumstances, have a toxic effect on the catalysts.

The process may also be advantageously applied in the low temperature carbonization of solid bituminous substances with the aid of scavenging gases, and further the present method of operating may also be applied in other processes in which hydrocarbons are formed or converted, for example in the cracking of heavy mineral oils or tar oils and the like with the assistance of hot inert gases.

The present invention is applicable in processes carried out at ordinary pressure, or at pressures ranging from 5, 20, 100, 200 to even thousand atmospheres or more.

The nature of the invention will be further illustrated with reference to the accompanying drawing which shows diagrammatically apparatus, in which the process of the present invention can be carried out, in sectional elevation, though the invention is not limited thereto.

In Figure 1 a plant is illustrated in which gases, for example hydrogen are circulated by means of a pump $a$ through the reaction space in which a catalyst is arranged which is illustrated in the said diagram by shading. The substances to be treated, for example, mineral oils, tars and the like are introduced into the reaction space in a liquid or vaporous state. In case the reaction is carried out in the liquid phase the apparatus is provided with suitable means ensuring that the liquid does not surmount a definite level thereby preventing pumping of the oil. The gases and vapors leaving the reaction space enter into the condenser $d$ and then into the stripping vessel $e$ in which the liquid hydrocarbons are separated and the uncondensed gases are then returned to the reaction space by means of the pump $a$, if desired, after an addition of fresh gas. A piston is arranged in the reaction vessel which imparts a pulsating or oscillating motion to the gases and vapors in the reaction space by moving these quickly to and fro. Thus a very effective scavenging of the catalysts and the materials to be treated with the gases is obtained and a high yield thus produced.

Figure 2:
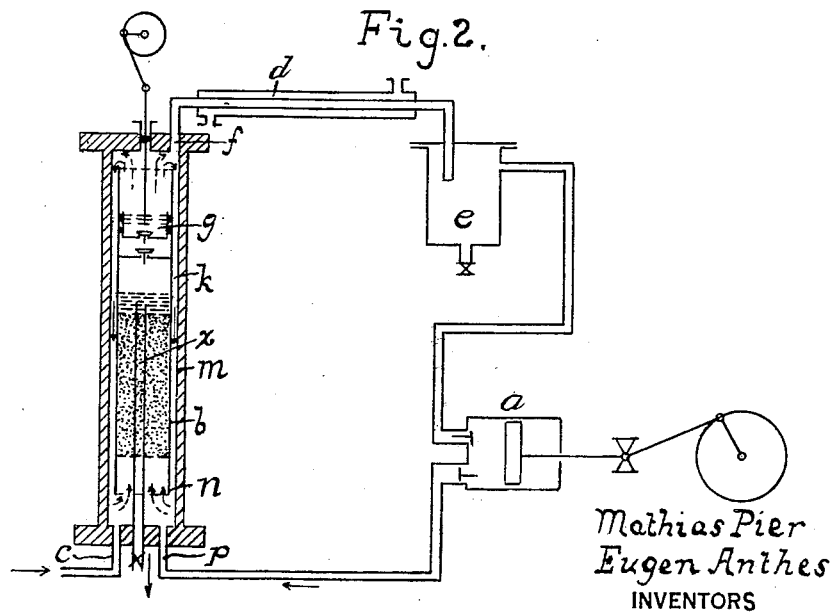

According to Figure 2 a reaction space $b$ bounded by a cylindrical mantel $n$ is arranged in a high pressure vessel $m$. Between the reaction space and the walls of the high pressure vessel is a mantel space $k$. The liquid materials to be treated are introduced at $c$ and fresh hydrogen gas be introduced at $p$. The removal of the reaction products may be effected at $f$. Sludge-like products formed in the process are drawn off by means of the overflow pipe $x$, which is situated vertically in the reaction vessel with its open end at a definite height therein. By suitably adjusting the rate of supply of the liquids introduced at $c$ and continuously removing the sludge-like products at $x$, it is possible to maintain the liquid level at such a height that pumping of the liquid is prevented. The products leaving the reaction vessel are condensed in a condenser $d$ and separated off from the gases in a stripping vessel $e$. The gases which have not been condensed are returned into the reaction space by means of the pump $a$. If the inner pump $g$ is of higher effectiveness than the pump $a$, part of the gases which are being circulated from the reaction space $b$, through the intermediate space $k$, are again returned into the reaction space in circulation without cooling. According to this manner of operation a very effective scavenging of the substances to be treated and also of the catalysts is attained with comparatively small amounts of gases and a better economy of the process is thus obtained.

The following example will further illustrate the nature of this invention which, however, is not limited thereto.

Example

A middle oil produced from brown-coal and free from constituents boiling below 200° centigrade is passed in the presence of hydrogen over a molybdenum-chromium catalyst at about 460 to 480° centigrade under a pressure of about 200 atmospheres. In the reaction vessel there is arranged a valve-less piston pump by which the gases are imparted a rapid oscillating movement. The quantity of hydrogen required is much smaller, and only one third of the amount of hydrogen is to be circulated and nevertheless the yield in benzines is as high as when employing the large amounts of hydrogen according to the method of operating hitherto employed, when working without the said oscillating pump and the same result can be obtained with about two thirds of the amount of the catalyst usually required.

What we claim is:—

1. In an apparatus suitable for the heat treatment of carbonaceous materials with gases, a reaction vessel, means for admitting gases to and withdrawing them from said reaction vessel, tubes concentrically arranged in said reaction vessel, the outer of said tubes being provided with an elongation near the entrance of gas and the inner of said tubes being connected with the gas discharge, said tubes providing passageways for the admitted gas permitting the same to move first through the space between the wall of the reaction vessel and the outer of the inserted tubes, then in the opposite direction within said outer tube, and finally through the inner tube, a piston capable of reciprocating within the elongation of said outer tube for effecting the movement of said gas, and means for reciprocating said piston.

2. In a process for thermally converting hydrocarbon materials in a reaction zone having a stationary catalytic body therein, the steps of effecting the conversion in the presence of gases or vapors by operating in a cycle in which the gases or vapors are continuously withdrawn from and returned to the reaction zone and imparting to the gases and vapors while in the reaction zone, an additional movement comprising a continuous oscillatory flow of said gases or vapors repeatedly through said catalytic body.

3. In a process for thermally converting hydrocarbon materials in a reaction zone having a stationary catalytic body therein, the steps which comprise effecting the conversion in the presence of permanent gases while working in a cycle in which a part at least of the permanent gases are withdrawn from the reaction zone together with at least part of the products of conversion, separated from said products and returned to the reaction zone, and imparting to the gases while in the reaction zone a continuous oscillatory movement which causes said gases to pass repeatedly through said catalytic body at a higher rate of speed than said gases are withdrawn from and returned to said reaction zone.

4. In a process for thermally converting hydrocarbon materials by operating in a vessel having a central reaction zone spaced from the walls of the vessel and a stationary catalytic body in said reaction zone, the steps of effecting the process in the presence of permanent gases while operating in a cycle in which at least a part of the permanent gases are continuously withdrawn from and returned to the reaction vessel and imparting a continuous oscillatory movement to said gases while in the reaction vessel to cause them to circulate repeatedly through said catalytic body and the space between the walls of said vessel and reaction zone at a speed greater than the speed at which they enter and leave said vessel.

5. The process as defined in claim 3 wherein the conversion is one of destructive hydrogenation and the gases are hydrogenating gases.

6. The process as defined in claim 4 in which the circulation in the reaction vessel is effected without substantial heat loss.

7. The process as defined in claim 3 wherein the process is one of destructive hydrogenation carried out in the presence of hydrogenating gases at a temperature of from 460 to 480° C. and a pressure of 200 atmospheres and the catalytic body comprises molybdenum and chromium.

8. Apparatus for effecting the thermal conversion of carbonaceous materials comprising a reaction vessel, a stationary catalytic body in said reaction vessel, means for admitting a gas into said reaction vessel, means for withdrawing said gas from said vessel and means in said vessel for imparting a continuous oscillatory movement of said gas through said catalytic body.

9. Apparatus as in claim 8 wherein the means for oscillating said gas comprises a piston movable in the upper end of said vessel.

10. Apparatus for destructively hydrogenating hydrocarbon materials comprising a reaction vessel, a tube in said vessel spaced from the walls thereof, a stationary catalytic body in said tube, means for admitting and withdrawing hydrogenating gases from said vessel and a piston operable in the upper end of said tube for imparting to said gases a rapid movement carrying the gases repeatedly through said catalytic body.

In testimony whereof we have hereunto set our hands.

MATHIAS PIER.
EUGEN ANTHES.